United States Patent
Honda

(10) Patent No.: US 10,385,147 B2
(45) Date of Patent: Aug. 20, 2019

(54) METHOD FOR PRODUCING POLYVINYLAMINE CROSSLINKED POLYMER PARTICLES

(71) Applicant: HYMO Corporation, Tokyo (JP)

(72) Inventor: Go Honda, Tokyo (JP)

(73) Assignee: Hymo Corporation, Tokyo (JP)

( * ) Notice: Subject to any disclaimer, the term of this patent is extended or adjusted under 35 U.S.C. 154(b) by 0 days.

(21) Appl. No.: 15/512,289

(22) PCT Filed: May 26, 2015

(86) PCT No.: PCT/JP2015/064978
§ 371 (c)(1),
(2) Date: Mar. 17, 2017

(87) PCT Pub. No.: WO2016/042846
PCT Pub. Date: Mar. 24, 2016

(65) Prior Publication Data
US 2017/0275393 A1    Sep. 28, 2017

(30) Foreign Application Priority Data
Sep. 18, 2014 (JP) .................................. 2014-189531

(51) Int. Cl.
  *C08F 8/12*     (2006.01)
  *C08F 220/54*   (2006.01)
  *C08F 2/18*     (2006.01)
  *C08F 212/36*   (2006.01)
  *C08F 226/02*   (2006.01)
  *B01J 20/26*    (2006.01)

(52) U.S. Cl.
  CPC .............. *C08F 8/12* (2013.01); *B01J 20/267* (2013.01); *C08F 2/18* (2013.01); *C08F 212/36* (2013.01); *C08F 226/02* (2013.01); *C08F 220/54* (2013.01)

(58) Field of Classification Search
  CPC .... C08F 8/12; C08F 2/18; C08F 20/54; C08F 120/54; C08F 220/54; C08F 212/36; B01J 20/267
  See application file for complete search history.

(56) References Cited

U.S. PATENT DOCUMENTS

| | | | | | |
|---|---|---|---|---|---|
| 3,689,439 | A | * | 9/1972 | Field et al. ............... | A23L 2/80 521/119 |
| 5,630,907 | A | * | 5/1997 | Nilz ......................... | C08F 8/12 162/168.1 |
| 5,830,844 | A | * | 11/1998 | Detering .............. | C11D 3/0021 510/475 |
| 2002/0198317 | A1 | * | 12/2002 | Fong ........................ | C02F 1/56 524/872 |

FOREIGN PATENT DOCUMENTS

| | | |
|---|---|---|
| EP | 0990667 A2 | 4/2000 |
| JP | 61-051007 A | 3/1986 |
| JP | 5-125117 A | 5/1993 |
| JP | 6-190235 A | 7/1994 |
| JP | 9-071660 A | 3/1997 |
| JP | 2001-129395 A | 5/2001 |
| JP | 2001-253920 A | 9/2001 |
| JP | 2006-000759 A | 1/2006 |

OTHER PUBLICATIONS

Vivaldo-Lima et al., Ind. Eng. Chem. Res. 36 (1997) 939-965.*

* cited by examiner

*Primary Examiner* — Roberto Rabago
(74) *Attorney, Agent, or Firm* — Arent Fox LLP

(57) ABSTRACT

A method for efficiently producing polyvinylamine crosslinked polymer particles by simple operation without using an organic solvent is provided. In the present invention, polyvinylamine crosslinked polymer particles can be produced by performing suspension polymerization in salt water containing N-vinylcarboxylic acid amide and a polyvinyl compound in the presence of a dispersant to obtain particles of a polyvinyl carboxylic acid amide crosslinked polymer and subsequently hydrolyzing the polyvinyl carboxylic acid amide crosslinked polymer. Divinylbenzene is preferred as the polyvinyl compound. N-Vinylcarboxylic acid amide, acrylonitrile, and a polyvinyl compound may be used.

6 Claims, No Drawings

METHOD FOR PRODUCING POLYVINYLAMINE CROSSLINKED POLYMER PARTICLES

TECHNICAL FIELD

The present invention relates to a method for producing polyvinylamine crosslinked polymer particles.

BACKGROUND ART

Polyvinylamine crosslinked polymer particles have been proposed for a wide range of usage, such as gas adsorbents and anion exchange resins. As an example method for producing polyvinylamine crosslinked polymer particles, there has been proposed a method for obtaining a polyvinylamine crosslinked product, for example, by copolymerization of N-vinylformamide (hereinafter abbreviated as NVF) and divinylbenzene or a (meth)acrylate- or (meth) acrylamide-based crosslinkable monomer and subsequent hydrolysis of the formamide group of the obtained crosslinked polymer to provide an amino group (Patent Literature 1). In this method, however, the polymer needs to be dried and pulverized after the polymerization is complete, and the various forms of the product are obtained. There has also been disclosed a method of reverse-phase suspension polymerization of NVF and divinylbenzene in cyclohexane while stirring (Patent Literature 2). In this method, crosslinked polymer particles are normally obtained. However, after polymerization, cyclohexane as polymerization medium, needs to be removed, which requires an operation such as evaporation. In addition, a problem associated with residual cyclohexane and the like arises because it is difficult to completely remove cyclohexane and the like.

Patent Literature 1: Japanese Patent Application Laid-Open No. Sho. 61-51007
Patent Literature 2: Japanese Patent Application Laid-Open No. Hei. 6-190235

SUMMARY OF INVENTION

Technical Problem to be Solved

An object of the present invention is to efficiently produce polyvinylamine crosslinked polymer particles by simple operation without using an organic solvent.

Solution to Problem

As a result of diligent studies to solve the above-mentioned problems, it has been found that polyvinylamine crosslinked polymer particles are simply obtained as follows: subjecting N-vinylcarboxylic acid amide and a polyvinyl compound to suspension polymerization in salt-dissolved water in the presence of a dispersant to obtain polyvinyl carboxylic acid amide crosslinked polymer particles; and hydrolyzing the crosslinked polymer particles after the salt and the like are removed by washing with water.

That is, the present invention relates to a method for producing polyvinylamine crosslinked polymer particles by subjecting N-vinylcarboxylic acid amide and a polyvinyl crosslinkable compound to suspension polymerization in salt water in the presence of a dispersant to obtain particles of a polyvinyl carboxylic acid amide crosslinked polymer and subsequently hydrolyzing the crosslinked polymer.

Advantageous Effects of Invention

According to the present invention, polyvinylamine crosslinked polymer particles can be produced simply and efficiently without using an organic solvent.

DESCRIPTION OF EMBODIMENTS

The present invention will be described below in detail.

As a technique for producing polyvinylamine crosslinked polymer particles in the present invention, ordinary suspension polymerization is first employed. That is, suspension polymerization in salt water in the present invention can be performed by suspending N-vinylcarboxylic acid amide, a polyvinyl compound, optionally, a monomer copolymerizable with the N-vinylcarboxylic acid amide, a polymerization initiator, and a dispersant in salt water, and stirring the suspension at any strength to generate monomer droplets suspension and thus to cause radical polymerization. The size of the monomer droplets is controlled with the dispersant and the stirring strength. The size of the liquid droplets is 0.01 mm to 10 mm and preferably 0.1 mm to 5 mm.

Examples of the N-vinylcarboxylic acid amide monomer used in the present invention may include N-vinylformamide, N-methyl-N-vinylformamide, N-vinylacetamide, N-methyl-N-vinylacetamide, N-vinylpropionamide, N-methyl-N-vinylpropionamide, N-vinylbutyramide, and N-vinylisobutyramide. Preferred are N-vinylformamide and N-vinylacetamide. Besides such N-vinylcarboxylic acid amide monomers, monomers copolymerizable with N-vinylcarboxylic acid amide may be used. Examples of the monomers copolymerizable with N-vinylcarboxylic acid amide may include (meth)acrylonitrile, (meth)acrylamide, N-alkyl(meth)acrylamide, N,N'-dialkyl(meth)acrylamide, N,N'-dialkylaminoalkyl(meth)acrylamide, an alkali metal salt or ammonium salt of (meth)acrylamide alkane sulfonic acid, an alkali metal salt or ammonium salt of (meth)acrylic acid, hydroxyalkyl (meth)acrylate, dialkylaminoalkyl (meth)acrylate, a (meth)acryloyloxy alkyl-trimethylammonium salt, an alkali metal salt or ammonium salt of (meth)acryloyloxy alkane sulfonic acid, N-vinylpyrrolidone, a diallyl-dialkyl ammonium salt, vinylpyridine, vinylimidazole, a vinylbenzyl trialkyl ammonium salt, and an alkali metal salt or ammonium salt of vinylsulfonic acid. These monomers may be used alone or in combination of two or more. Acrylonitrile is particularly preferred.

Examples of the polyvinyl compound that can be used may include aromatic compounds having polyvinyl groups, such as divinylbenzene, trivinylbenzene, and divinyltoluene; poly(meth)acrylates, such as ethylene glycol di(meth)acrylate, diethylene glycol di(meth)acrylate, glycerol di(meth)acrylate, and trimethylolpropane tri(meth)acrylate; and methylenebisacrylamide. However, poly(meth)acrylate, methylenebisacrylamide, and the like tend to be hydrolyzed during polymerization, and thus aromatic polyvinyl compounds are preferably used. Divinylbenzene is most preferred. The amount of the polyvinyl compound to be added is in the range of 0.1 to 50% by mass and preferably in the range of 0.1 to 20% by mass with respect to the monomer(s). To obtain more spherical shaped particles of N-vinylcarboxylic acid amide containing more than 5% by mass of the polyvinyl compound, a monomer copolymerizable with N-vinylcarboxylic acid amide is preferably used. The amount of the copolymerizable monomer to be added is in the range of 50% by mass or less with respect to the total monomers. In particular, acrylonitrile is preferably used.

Examples of the polymerization initiator may include azo-based and peroxide-based polymerization initiators, such as 2,2'-azobis(2,4-dimethylvaleronitrile), 2,2'-azobis(4-methoxy-2,4-dimethylvaleronitrile), 2,2'-azobis(2-methylpropionitrile), 2,2'-azobis-2-amidinopropane hydrochloride, 4,4'-azobis-4-cyanovaleric acid, 2,2'-azobis[(2-(5-methyl-imidazoline-2-yl)propane)] hydrochloride, 2,2'-azobis[(2-(2-imidazoline-2-yl)propane)]hydrochloride and the like, ammonium or potassium persulfate, hydrogen peroxide, benzoyl peroxide, lauroyl peroxide, octanoyl peroxide, succinic peroxide, and t-butylperoxy-2-ethylhexanoate. Among these, oil-soluble initiators, such as 2,2'-azobis(2,4-dimethylvaleronitrile) and 2,2'-azobis(4-methoxy-2,4-dimethylvaleronitrile), are preferred. In addition, two or more initiators can be used in combination. The amount of the initiator to be added is normally 0.02 to 5% by mass and preferably 0.05 to 2% by mass with respect to the monomer (s).

Examples of the salt to be used may include ammonium sulfate, sodium sulfate, ammonium chloride, sodium chloride, and calcium chloride. Among these, ammonium sulfate is particularly preferred. These salts may be used alone or as a mixture thereof. The amount of the salt to be added is in the range of 50 to 100% by mass with respect to water. The addition of less than 50% by mass of the salt does not allow N-vinylcarboxylic acid amide to be separated into two phases. The addition of 100% by mass of the salt provides a sufficient effect attributed to the salt. The addition of more than 100% by mass of the salt is uneconomical. The amount of the salt is preferably 60 to 90% by mass.

As a dispersant, a high-molecular weight polymer dispersant is preferred. As the high-molecular weight polymer dispersant, either an ionic or nonionic dispersant can be used and preferably an ionic dispersant is used. The ionic high molecule weight polymer is a polymer of (meth)acryloyloxyethyl trimethylammonium chloride, dimethyldiallylammonium chloride, or the like, which is a cationic monomer. A copolymer of such a cationic monomer and a nonionic monomer can be used. Examples of the nonionic monomer may include acrylamide, N-vinylformamide, N-vinylacetamide, N-vinylpyrrolidone, N,N'-dimethylacrylamide, acrylonitrile, diacetone acrylamide, and 2-hydroxyethyl (meth) acrylate. Examples of the nonionic high-molecular weight polymer dispersant may include polyvinyl alcohol, and polyethylene glycol polyacrylamide. The weight average molecular weight of the ionic high-molecular dispersant is 5,000 to 2,000,000 and preferably 50,000 to 1,000,000. The weight average molecular weight of the nonionic high-molecular dispersant is 1,000 to 100,000 and preferably 1,000 to 50,000. The amount of the dispersant to be added is normally 0.05 to 5% by mass and preferably 0.1 to 2% by mass with respect to water.

The polymerization reaction is normally performed at a temperature of 30° C. to 100° C. for 1 hour to 15 hours.

After polymerization, the salt, the dispersant, unreacted monomers, and the like can be removed by washing with water.

The copolymer particles are purified by the above-mentioned method and then subjected to hydrolysis. The hydrolysis of the N-vinylcarboxylic acid amide crosslinked polymer particles can be performed under basic or acidic conditions. To obtain free-type polyvinylamine crosslinked polymer particles, hydrolysis under basic conditions is preferred. To obtain salt-type polyvinylamine crosslinked polymer particles, hydrolysis under acidic conditions is preferred.

A base suitable for hydrolysis is not limited to particular ones as far as the pH during hydrolysis can be controlled within the range of 8 to 14. An aqueous solution of sodium hydroxide, potassium hydroxide, or ammonia is most preferably used. The amount of the base to be added is preferably in the range of 0.05 to 2.0 equivalents and more preferably in the range of 0.4 to 1.2 equivalents with respect to the formyl group of the polymer.

An acid suitable for hydrolysis is not limited to particular ones as far as the pH during hydrolysis can be controlled within the range of 0 to 5. Examples of the acid may include inorganic acids, such as hydrohalogenic acids, sulfuric acid, nitric acid, and phosphoric acid; and organic acids, such as mono- and di-carboxylic acids having 1 to 5 carbon atoms, sulfonic acid, benzenesulfonic acid, and toluenesulfonic acid. In particular, hydrohalogenic acids and hydrogen halide gases are preferably used, and hydrohalogenic acids are most preferably used. The amount of the acid to be added is preferably in the range of 0.05 to 2.0 equivalents and more preferably in the range of 0.4 to 1.2 equivalents with respect to the formyl group of the polymer.

Washing with water or the like after hydrolysis provides polyvinylamine crosslinked polymer particles. Free-type purified polyvinylamine crosslinked polymer particles are obtained by base hydrolysis, and salt-type purified polyvinylamine crosslinked polymer particles are obtained by acid hydrolysis.

The polyvinylamine crosslinked polymer particles obtained by the production method in the present invention are used in gas treatment applications and ordinary water treatment applications, as well as production of pure water for, for example, semiconductor fabrication, nuclear power generation, thermal power generation, and medical and cosmetic applications, desalination of process water, boiler feedwater, reaction solutions, and fermented liquids, adsorptive removal of acid substances, formaldehydes, and metal ions from waste water and the like, and adsorption of organic compounds and the like. Since the crosslinked polymer particles in the present invention are spherical, the use of the crosslinked polymer particles as an adsorbent in a column advantageously increases the packing efficiency to stabilize the flow channel and thus to improve the separation efficiency, and the use of the crosslinked polymer particles in ordinal water treatment applications or the like advantageously, for example, increases the capacity to adsorb a target substance and thus improves the treatment capacity.

EXAMPLES

Although the present invention is more specifically described below by way of Examples, the present invention is not limited to Examples below without departing from the gist of the present invention.

Example 1

(Polymerization Reaction) In a 300 mL four-necked flask, 50.0 g of desalted water, 30.0 g of ammonium sulfate, and 0.97 g of an aqueous solution of polyacryloyloxyethyl trimethylammonium chloride (polymer concentration: 20% by mass; weight average molecular weight: 800,000) were placed. The mixture was stirred until dissolution thereby to provide a polymerization bath.

A mixture of 29.95 g of N-vinylformamide, 0.15 g of a 55% by mass divinylbenzene, and 0.08 g of 2,2'-azobis(2, 4-dimethylvaleronitrile) (V-65, available from Wako Pure Chemical Industries, Ltd.), which was an azo-based polymerization initiator, was prepared as a monomer solution. The monomer solution and the polymerization bath were mixed and stirred at 200 rpm while the inside air of the flask was replaced with nitrogen. After 30 minutes, the mixture was heated for polymerization at 65° C. for one hour and then at 70° C. for two hours. After polymerization, the resulting product was filtered, washed with water, and filtered to obtain 344 g of hydrous polymer spherical particles. The solid content was 6.0%.

(Hydrolysis Reaction) 165.9 g of the hydrous polymer particles was placed in a four-necked flask, to which 14.0 g of a 48% by mass aqueous solution of sodium hydroxide was added. The mixture was subjected to hydrolysis at 80° C. for five hours while the mixture was stirred. The resulting product was washed with water and filtered to obtain 232.6 g of hydrous polyvinylamine spherical particles. As a result of microscopic examination, transparent spherical particles of 50 μm to 2 mm were observed.

Example 2

(Polymerization Reaction) In a 300 mL four-necked flask, 50.2 g of desalted water, 32.2 g of ammonium sulfate, and 1.00 g of an aqueous solution of polyacryloyloxyethyl trimethylammonium chloride (polymer concentration: 20% by mass; weight average molecular weight: 800,000) were placed. The mixture was stirred until dissolution thereby to provide a polymerization bath. A mixture of 19.62 g of N-vinylformamide, 0.44 g of a 55% by mass divinylbenzene, and 0.08 g of 2,2'-azobis(2,4-dimethylvaleronitrile) (V-65, available from Wako Pure Chemical Industries, Ltd.), which was an azo-based polymerization initiator, was prepared as a monomer solution. The monomer solution and the polymerization bath were mixed and stirred at 200 rpm while the inside air of the flask was replaced with nitrogen. After 30 minutes, the mixture was heated for polymerization at 60° C. for two hours and then at 70° C. for two hours. After polymerization, the resulting product was filtered, washed with water, and filtered to obtain 113.2 g of hydrous polymer spherical particles. The solid content was 12.4%.

(Hydrolysis Reaction) 80.7 g of the hydrous polymer particles was placed in a four-necked flask, to which 14.0 g of a 48% by mass aqueous solution of sodium hydroxide was added. The mixture was subjected to hydrolysis at 80° C. for five hours while the mixture was stirred. The resulting product was washed with water and filtered to obtain 85.0 g of hydrous polyvinylamine spherical particles. As a result of microscopic examination, transparent spherical particles of 50 μm to 2 mm were observed.

Example 3

(Polymerization Reaction) In a 300 mL four-necked flask, 50.0 g of desalted water, 35.2 g of ammonium sulfate, and 1.05 g of an aqueous solution of polyacryloyloxyethyl trimethylammonium chloride (polymer concentration: 20% by mass; weight average molecular weight: 800,000) were placed. The mixture was stirred until dissolution thereby to provide a polymerization bath. A mixture of 19.0 g of N-vinylformamide, 1.0 g of a 55% by mass divinylbenzene, and 0.08 g of 2,2'-azobis(2,4-dimethylvaleronitrile) (V-65, available from Wako Pure Chemical Industries, Ltd.), which was an azo-based polymerization initiator, was prepared as a monomer solution. The monomer solution and the polymerization bath were mixed and stirred at 250 rpm while the inside air of the flask was replaced with nitrogen. After 30 minutes, the mixture was heated for polymerization at 65° C. for one hour and then at 70° C. for three hours. After polymerization, the resulting product was filtered, washed with water, and filtered to obtain 79.4 g of hydrous polymer spherical particles. The solid content was 14.5%.

(Hydrolysis Reaction) 20.0 g of the hydrous polymer particles was placed in a four-necked flask, to which 4.2 g of a 48% by mass aqueous solution of sodium hydroxide was added. The mixture was subjected to hydrolysis at 80° C. for four hours while the mixture was stirred. The resulting product was washed with water and filtered to obtain 24.5 g of hydrous polyvinylamine spherical particles. As a result of microscopic examination, transparent spherical particles of 50 μm to 2 mm were observed.

Example 4

(Polymerization Reaction) In a 300 mL four-necked flask 50.1 g of desalted water, 32.0 g of ammonium sulfate, and 0.97 g of an aqueous solution of polyacryloyloxyethyl trimethylammonium chloride (polymer concentration: 20% by mass; weight average molecular weight: 800,000) were placed. The mixture was stirred until dissolution thereby to provide a polymerization bath.

A mixture of 19.8 g of N-vinylformamide, 0.23 g of a 55% by mass divinylbenzene, and 0.08 g of 2,2'-azobis(2,4-dimethylvaleronitrile) (V-65, available from Wako Pure Chemical Industries, Ltd.), which was an azo-based polymerization initiator, was prepared as a monomer solution. The monomer solution and the polymerization bath were mixed and stirred at 250 rpm while the inside air of the flask was replaced with nitrogen. After 30 minutes, the mixture was heated for polymerization at 60° C. for two hours and then at 70° C. for three hours. After polymerization, the resulting product was filtered, washed with water, and filtered to obtain 168.2 g of hydrous polymer spherical particles. The solid content was 8.2%.

(Hydrolysis Reaction) 121.8 g of the hydrous polymer particles was placed in a four-necked flask, to which 14.5 g of a 48% by mass aqueous solution of sodium hydroxide was added. The mixture was subjected to hydrolysis at 80° C. for seven hours while the mixture was stirred. The resulting product was washed with water and filtered to obtain 147.7 g of hydrous polyvinylamine spherical particles. As a result of microscopic examination, transparent spherical particles of 50 μm to 2 mm were observed.

Example 5

(Polymerization Reaction) In a 300 mL four-necked flask, 50.1 g of desalted water, 32.0 g of ammonium sulfate, and 1.04 g of an aqueous solution of polyacryloyloxyethyl trimethylammonium chloride (polymer concentration: 20% by mass; weight average molecular weight: 800,000) were placed. The mixture was stirred until dissolution thereby to provide a polymerization bath. A mixture of 30.0 g of N-vinylformamide, 0.15 g of a 55% by mass divinylbenzene, and 0.09 g of 2,2'-azobis(4-methoxy-2,4-dimethylvaleronitrile) (V-70, available from Wako Pure Chemical Industries, Ltd.), which was an azo-based polymerization initiator, was prepared as a monomer solution. The monomer solution and the polymerization bath were mixed and stirred at 250 rpm while the inside air of the flask was replaced with nitrogen. After 30 minutes, the mixture was heated for polymerization at 40° C. for 1.5 hours and then at 60° C. for 1.5 hours. After polymerization, the resulting product was filtered, washed with water, and filtered to obtain 364.1 g of hydrous polymer spherical particles. The solid content was 6.5%.

(Hydrolysis Reaction) 154.0 g of the hydrous polymer particles was placed in a four-necked flask, to which 17.6 g of a 48% by mass aqueous solution of sodium hydroxide was added. The mixture was subjected to hydrolysis at 80° C. for seven hours while the mixture was stirred. The resulting product was washed with water and filtered to obtain 232.6 g of hydrous polyvinylamine spherical particles. As a result of microscopic examination, transparent spherical particles of 50 μm to 2 mm were observed.

Example 6

(Polymerization Reaction) In a 300 mL four-necked flask 49.3 g of desalted water, 32.0 g of ammonium sulfate, and 1.19 g of an aqueous solution of polyacryloyloxyethyl trimethylammonium chloride (polymer concentration: 20% by mass; weight average molecular weight: 800,000) were placed. The mixture was stirred until dissolution thereby to provide a polymerization bath. A mixture of 18.01 g of N-vinylformamide, 1.02 g of divinylbenzene (available from Wako Pure Chemical Industries, Ltd.), 1.06 g of acrylonitrile, and 0.06 g of 2,2'-azobis(4-methoxy-2,4-dimethylvaleronitrile) (V-70, available from Wako Pure Chemical Industries, Ltd.), which was an azo-based polymerization initiator, was prepared as a monomer solution. The monomer solution and the polymerization bath were mixed and stirred at 300 rpm while the inside air of the flask was replaced with nitrogen. After 30 minutes, the mixture was heated for polymerization at 45° C. for two hours and then at 60° C. for one hour. After polymerization, the resulting product was filtered, washed with water, and filtered to obtain 51.1 g of hydrous polymer spherical particles. The solid content was 31.7%.

(Hydrolysis Reaction) 31.6 g of the hydrous polymer particles was placed in a four-necked flask, to which 23.4 g of a 48% by mass aqueous solution of sodium hydroxide was added. The mixture was subjected to hydrolysis at 80° C. for seven hours while the mixture was stirred. The resulting product was washed with water and filtered to obtain 31.4 g of hydrous polyvinylamine spherical particles. As a result of microscopic examination, semi-transparent spherical particles of 50 μm to 1 mm were observed.

Example 7

(Polymerization Reaction) In a 300 mL four-necked flask, 98.39 g of desalted water, 64.04 g of ammonium sulfate, and 2.21 g of an aqueous solution of polyacryloyloxyethyl trimethylammonium chloride (polymer concentration: 20% by mass; weight average molecular weight: 800,000) were placed. The mixture was stirred until dissolution thereby to provide a polymerization bath. A mixture of 28.85 g of N-vinylformamide, 3.22 g of divinylbenzene (available from Wako Pure Chemical Industries, Ltd.), 8.03 g of acrylonitrile, and 0.12 g of 2,2'-azobis(4-methoxy-2,4-dimethylvaleronitrile) (V-70, available from Wako Pure Chemical Industries, Ltd.), which was an azo-based polymerization initiator, was prepared as a monomer solution. The monomer solution and the polymerization bath were mixed and stirred at 300 rpm while the inside air of the flask was replaced with nitrogen. After 30 minutes, the mixture was heated for polymerization at 45° C. for two hours and then at 60° C. for one hour. After polymerization, the resulting product was filtered, washed with water, and filtered to obtain 72.8 g of hydrous polymer spherical particles. The solid content was 45.8%.

(Hydrolysis Reaction) 21.8 g of the hydrous polymer particles was placed in a four-necked flask, to which 23.46 g of a 48% by mass aqueous solution of sodium hydroxide was added. The mixture was subjected to hydrolysis at 80° C. for seven hours while the mixture was stirred. The resulting product was washed with water and filtered to obtain 20.0 g of hydrous polyvinylamine spherical particles. As a result of microscopic examination, semi-transparent spherical particles of 50 μm to 1 mm were observed.

Comparative Example 1

(Polymerization Reaction) In a 300 mL four-necked flask, 50.0 g of desalted water and 0.97 g of an aqueous solution of polyacryloyloxyethyl trimethylammonium chloride (polymer concentration: 20% by mass; weight average molecular weight: 800,000) were placed. The mixture was stirred until dissolution thereby to provide a polymerization bath. A mixture of 29.95 g of N-vinylformamide, 0.15 g of a 55% by mass divinylbenzene, and 0.08 g of 2,2'-azobis (2,4-dimethylvaleronitrile) (V-65, available from Wako Pure Chemical Industries, Ltd.), which was an azo-based polymerization initiator, was prepared as a monomer solution. The monomer solution and the polymerization bath were mixed and stirred at 200 rpm while the inside air of the flask was replaced with nitrogen. After 30 minutes, the mixture was heated for polymerization at 65° C. for one hour and then at 70° C. for two hours. After polymerization, the resulting product was filtered, washed with water, and filtered. However, the obtained polymer was unshaped and therefore spherical particles were not obtained.

Comparative Example 2

(Polymerization Reaction) In a 300 mL four-necked flask, 50.0 g of desalted water and 30.0 g of ammonium sulfate were placed. The mixture was stirred until dissolution thereby to provide a polymerization bath. A mixture of 29.95 g of N-vinylformamide, 0.15 g of a 55% by mass divinylbenzene, and 0.08 g of 2,2'-azobis(2,4-dimethylvaleronitrile) (V-65, available from Wako Pure Chemical Industries, Ltd.), which was an azo-based polymerization initiator, was prepared as a monomer solution. The monomer solution and the polymerization bath were mixed and stirred at 200 rpm while the inside air of the flask was replaced with nitrogen. After 30 minutes, the mixture was heated for polymerization at 65° C. for one hour and then at 70° C. for two hours. After polymerization, the resulting product was filtered, washed with water, and filtered. However, the obtained polymer was unshaped and therefore spherical particles were not obtained.

The invention claimed is:

1. A method for producing polyvinylamine crosslinked polymer particles comprising the steps:
   mixing and stirring a monomer solution containing N-vinylcarboxylic acid amide and a polyvinyl compound in a salt water in presence of a dispersant to generate a suspension of monomer droplets;
   obtaining crosslinked polymer particles from the suspension of monomer droplets by a polymerization reaction; and
   subsequently hydrolyzing the crosslinked polymer particles to produce the polyvinylamine crosslinked polymer particles, wherein the salt water includes ammonium sulfate, and wherein the amount of salt is in the range from 50% to 100% by mass with respect to water.

2. The production method according to claim 1, wherein the monomer solution further contains acrylonitrile.

3. The production method according to claim 1, wherein the polyvinyl compound is divinylbenzene.

4. The production method according to claim 2, wherein the polyvinyl compound is divinylbenzene.

5. The production method according to claim 1, wherein the diameter of the particles is in the range of 50 µm to 2 mm.

6. The production method according to claim 1, further comprising filtering the product obtained from polymerization and washing it with water.

* * * * *